(12) United States Patent
Blass (10) Patent No.: US 10,511,588 B2
(45) Date of Patent: Dec. 17, 2019

(54) FORWARD-SECURE CRASH-RESILIENT LOGGING DEVICE

(71) Applicant: Airbus Defence and Space GmbH, Taufkirchen (DE)

(72) Inventor: Erik-Oliver Blass, Munich (DE)

(73) Assignee: Airbus Defence and Space GmbH (DE)

( * ) Notice: Subject to any disclaimer, the term of this patent is extended or adjusted under 35 U.S.C. 154(b) by 264 days.

(21) Appl. No.: 15/334,675

(22) Filed: Oct. 26, 2016

(65) Prior Publication Data
US 2017/0126663 A1 May 4, 2017

(30) Foreign Application Priority Data
Oct. 29, 2015 (EP) ..................................... 15192227

(51) Int. Cl.
*H04L 29/06* (2006.01)
*H04L 9/00* (2006.01)
*H04L 9/32* (2006.01)

(52) U.S. Cl.
CPC ............ *H04L 63/0815* (2013.01); *H04L 9/00* (2013.01); *H04L 63/061* (2013.01); *H04L 63/0876* (2013.01); *H04L 9/3242* (2013.01); *H04L 2209/08* (2013.01); *H04L 2209/38* (2013.01)

(58) Field of Classification Search
CPC .............. H04L 63/0815; H04L 63/061; H04L 63/0876
USPC ............................................... 713/170; 726/7
See application file for complete search history.

(56) References Cited

U.S. PATENT DOCUMENTS

| 5,784,552 A | * | 7/1998 | Bishop | G06F 11/3664 714/38.12 |
| 5,978,475 A | * | 11/1999 | Schneier | G06F 21/6209 713/164 |
| 6,493,837 B1 | * | 12/2002 | Pang | G06F 11/3466 707/999.202 |
| 6,725,240 B1 | * | 4/2004 | Asad | G06F 21/6227 |

(Continued)

OTHER PUBLICATIONS

Ci Ma et al: "A new approach to secure logging", ACM Transactions on Storage, vol. 5, No. 1, Jan. 1, <009 (Jan. 1, 2009), pp. 1-21, XP058033695, ISSN: 1553-3077.*

(Continued)

*Primary Examiner* — Khalil Naghdali
(74) *Attorney, Agent, or Firm* — Lerner, David, Littenberg, Krumholz & Mentlik, LLP (57) ABSTRACT

A logging device configured to store log messages, includes a storage device having a plurality of log entry locations which can be ordered as a sequence, an encryption device configured to generate the encrypted log messages from log messages, an authentication code generator configured to generate an authentication code from the encrypted log message, a key evolving device, a state storage device configured to store state variables for use by the encryption device, the authentication code generator and/or the key evolving device. Furthermore, a verification device configured to verify log entries stored in log entry locations of the storage device is also described. A method for storing log entries in log entry locations of a storage device of a logging device as well as to a method for verifying the integrity of log entries stored in log entry locations of a storage device is also described.

1 Claim, 3 Drawing Sheets

(56) References Cited

U.S. PATENT DOCUMENTS

| | | | | |
|---|---|---|---|---|
| 7,546,488 | B2* | 6/2009 | Walker | G06F 11/3476 714/38.1 |
| 7,818,610 | B2* | 10/2010 | Rogers | G06F 11/1469 714/10 |
| 7,870,355 | B2* | 1/2011 | Erofeev | G06F 11/1456 711/100 |
| 8,089,807 | B1* | 1/2012 | Steffler | G11C 11/56 365/185.03 |
| 9,727,263 | B2* | 8/2017 | Bennett | G06F 12/00 |
| 2008/0066178 | A1* | 3/2008 | Jin | G06F 21/14 726/23 |
| 2009/0089610 | A1* | 4/2009 | Rogers | G06F 11/1469 714/5.1 |
| 2010/0088517 | A1* | 4/2010 | Piersol | H04L 9/3236 713/171 |
| 2010/0088551 | A1* | 4/2010 | Berkner | G06Q 10/0635 714/47.1 |
| 2011/0138106 | A1* | 6/2011 | Prabhakaran | G06F 12/0804 711/103 |
| 2012/0005542 | A1* | 1/2012 | Petersen | G06F 11/0709 714/48 |
| 2012/0136889 | A1* | 5/2012 | Jagannathan | H04L 49/3009 707/769 |
| 2012/0284299 | A1* | 11/2012 | Ishikawa | G06F 21/6263 707/769 |
| 2013/0227236 | A1* | 8/2013 | Flynn | G11C 16/26 711/165 |
| 2016/0110121 | A1* | 4/2016 | Singh | G06F 3/0613 711/156 |

OTHER PUBLICATIONS

Search Report EP 15192227.5 dated Apr. 8, 2016.
Accorsi R: "Safe-Keeping Digital Evidence with Secure Logging Protocols: State of the Art and Challenges", IT Security Incident Management and IT Forensics, 2009. IMF '09. Fifth International Conference on, IEEE, Piscataway, NJ, USA, Sep. 15, 2009 (Sep. 15, 2009), pp. 94-110, XP031540588, ISBN: 978-0-7695-3807-5 * section 4.2 *.
Hans Hedbom et al: "Unlinking database entries: Implementation issues in privacy preserving secure loggi ng", Security and Communication Networks (IWSCN), 2010 2nd International Workshop on, IEEE, Piscataway, NJ, USA, May 26, 2010 (May 26, 2010), pp. 1-7, XP031827248, ISBN: 978-1-4244-6938-3 * sections III and IV *.
Di Ma et al: "A new approach to secure logging", ACM Transactions on Storage, vol. 5, No. 1, Jan. 1, 2009 (Jan. 1, 2009), pp. 1-21, XP058033695, ISSN: 1553-3077.
Jason E Holt: "Logcrypt: Forward Security and Public Verification for Secure Audit Logs", ACSW Frontiers '06 Proceedings of the 2006 Australasian Workshops on Grid Computing and E-Research, vol. 54, Jan. 1, 2006 (Jan. 1, 2006), pp. 203-211, XP055261271, ISBN: 978-1-920682-36-1.
M. Backes, C. Cachin, and A. Oprea. Secure Key-Updating for Lazy Revocation. In Proceedings of European Symposium on Research in Computer Security, vol. 4189 of Lecture Notes in Computer Science, pp. 327-346, Hamburg, Germany, 2006. Springer. ISBN 3-540-44601-X.
M. Bellare. New Proofs for NMAC and HMAC: Security without Collision-Resistance. In Proceedings of CRYPTO, pp. 602-619, Santa Barbara, USA, 2006. ISBN 3-540-37432-9.
M. Bellare and B.S. Yee. Forward-Security in Private-Key Cryptography. In Proceedings of Cryptographers' Track at the RSA Conference, pp. 1-18, San Francisco, USA, 2000. ISBN 978-3-540-36563-1.
M. Bellare, R. Canetti, and H. Krawczyk. Message authentication using hash functions: The HMAC construction. RSA Laboratories' CryptoBytes vol. 2, No. 1, 1996. <http://cseweb.ucsd.edu/~mihir/papers/hmac-cb.pdf>.
E.-O. Blass and W. Robertson. TRESOR-HUNT: Attacking CPU-bound Encryption. In Proceedings Annual Computer Security Applications Conference, pp. 71-78, Orlando, USA, 2012. ISBN 978-1-4503-1312-4.
S. Dziembowski and K. Pietrzak. Leakage-Resilient Cryptography in the Standard Model. Cryptology ePrint Archive, Report 2008/240, 2008. <http://eprint.iacr.org/>.
S. Faust, K. Pietrzak, and J. Schipper. Practical Leakage-Resilient Symmetric Cryptography. In Proceedings of Cryptographic Hardware and Embedded Systems, vol. 7428 of Lecture Notes in Computer Science, pp. 213-232, Leuven, Belgium, 2012.
D.E. Knuth. The Art of Computer Programming, Seminumerical Algorithms, vol. 2, chapter 3.4.2, pp. 139-140. Addison Wesley, 2nd edition, 1981. ISBN 978-0201896848.
P.C. Kocher. Timing Attacks on Implementations of Diffie-Hellman, RSA, DSS, and Other Systems. In Proceedings of Advances in Cryptology, pp. 104-113, Santa Barbara, USA, 1996. ISBN 3-540-61512-1.
G.A. Marson and B. Poettering. Even More Practical Secure Logging: Tree-Based Seekable Sequential Key Generators. In Proceedings of European Symposium on Research in Computer Security, vol. 8713 of Lecture Notes in Computer Science, pp. 37-54, Wroclaw, Poland, 2014. Springer. ISBN 978-3-319-11211-4.
S. Micali and L. Reyzin. Physically Observable Cryptography. In Moni Naor, editor, Theory of Cryptography, vol. 2951 of Lecture Notes in Computer Science, pp. 278-296. 2004. ISBN 978-3-540-21000-9.
K. Pietrzak. A Leakage-Resilient Mode of Operation. In Proceedings of Advances in Cryptology, pp. 462-482, Cologne, Germany, 2009. ISBN 978-3-642-01000-2.
B. Schneier and J. Kelsey. Secure audit logs to support computer forensics. ACM Transactions on Information and System Security, 2(2):159-176, 1999.
A.A Yavuz, P. Ning, and M.K. Reiter. BAF and FI-BAF: Efficient and Publicly Verifiable Cryptographic Schemes for Secure Logging in Resource-Constrained Systems. Transactions on Information System Security, 15(2):9, 2012. ISSN 1094-9224.
Y. Yu, F.-X Standaert, O. Pereira, and M. Yung. Practical leakage-resilient pseudorandom generators. In Proceedings of Conference on Computer and Communications Security, pp. 141-151, Chicago, USA, 2010. ISBN 978-1-4503-0245-6.
Katz and Y. Lindell. Introduction to Modern Cryptography. Chapman & Hall, 2007. ISBN 1584885513.
G.A. Marson and B. Poettering. Practical Secure Logging: Seekable Sequential Key Generators. Cryptology ePrint Archive, Report 2013/397, 2013. <http://eprint.iacr.org/>.
Anonymous: "Fisher-Yates shuffle—Wikipedia", Sep. 28, 2015, XP055584860. From: https://en.wikipedia.org/w/index.php?title=Fisher-Yates_shuffle&oldid=6831 05835.

* cited by examiner

FORWARD-SECURE CRASH-RESILIENT LOGGING DEVICE

FIELD OF THE INVENTION

The invention relates to a logging device configured to store log messages, comprising a storage device having a plurality of log entry locations which can be ordered as a sequence and an encryption device configured to generate the encrypted log messages from log messages. Furthermore, the logging device comprises an authentication code generator configured to generate an authentication code from the encrypted log message. A key evolving device and a state storage device configured to store state variables for use by the encryption device, the authentication code generator and/or the key evolving device are also provided. Furthermore, the invention relates to a verification device configured to verify log entries stored in log entry locations of the storage device. The invention also relates to a method for storing log entries in log entry locations of a storage device of a logging device comprising the steps of encrypting a log message using a secret to create an encrypted log message, calculating an authentication code from the secret and the encrypted log message to create a log entry comprising the encrypted log message and the authentication code and storing the log entry. The invention also relates to a method for verifying the integrity of log entries stored in log entry locations of a storage device by verifying integrity of the log entry by means of checking the authentication code stored together with the encrypted log message.

BACKGROUND OF THE INVENTION

Exposition of the particular requirements and known methods relating to forward-secure logging devices may be gathered from the following documents:

[1] M. Backes, C. Cachin, and A. Oprea. Secure Key-Updating for Lazy Revocation. In Proceedings of European Symposium on Research in Computer Security, volume 4189 of Lecture Notes in Computer Science, pages 327-346, Hamburg, Germany, 2006. Springer. ISBN 3-540-44601-X.

[2] M. Bellare. New Proofs for NMAC and HMAC: Security without Collision-Resistance. In Proceedings of CRYPTO, pages 602-619, Santa Barbara, USA, 2006. ISBN 3-540-37432-9.

[3] M. Bellare and B. S. Yee. Forward-Security in Private-Key Cryptography. In Proceedings of Cryptographers' Track at the RSA Conference, pages 1-18, San Francisco, USA, 2000. ISBN 978-3-540-36563-1.

[4] M. Bellare, R. Canetti, and H. Krawczyk. Message authentication using hash functions: The HMAC construction. RSA Laboratories' CryptoBytes Vol. 2, No. 1, 1996. http://cseweb.ucsd.edu/~mihir/papers/hmac-cb.pdf.

[5] E.-O. Blass and W. Robertson. TRESOR-HUNT: Attacking CPU-bound Encryption. In Proceedings Annual Computer Security Applications Conference, pages 71-78, Orlando, USA, 2012. ISBN 978-1-4503-1312-4.

[6] S. Dziembowski and K. Pietrzak. Leakage-Resilient Cryptography in the Standard Model. Cryptology ePrint Archive, Report 2008/240, 2008. http://eprint.iacr.org/.

[7] S. Faust, K. Pietrzak, and J. Schipper. Practical Leakage-Resilient Symmetric Cryptography. In Proceedings of Cryptographic Hardware and Embedded Systems, volume 7428 of Lecture Notes in Computer Science, pages 213-232, Leuven, Belgium, 2012.

[8] J. E. Holt. Logcrypt: forward security and public verification for secure audit logs. In Proceedings of Australasian Symposium on Grid Computing and e-Research, volume 54, pages 203-211, Hobart, Australia, 2006.

[9] J. Katz and Y. Lindell. Introduction to Modern Cryptography. Chapman & Hall, 2007. ISBN 1584885513.

[10] D. E. Knuth. The Art of Computer Programming, Seminumerical Algorithms, volume 2, chapter 3.4.2, pages 139-140. Addison Wesley, 2nd edition, 1981. ISBN 978-0201896848.

[11] P. C. Kocher. Timing Attacks on Implementations of Diffie-Hellman, RSA, DSS, and Other Systems. In Proceedings of Advances in Cryptology, pages 104-113, Santa Barbara, USA, 1996. ISBN 3-540-61512-1.

[12] Linux Kernel Documentation. /proc/sys/vm/dirty expire centisecs, 2015. Standard value is 30 sec on kernel 3.16.0-4, 64 bit, https://www.kernel.org/doc/Documentation/sysctl/vm.txt.

[13] D. Ma and G. Tsudik. A New Approach to Secure Logging. ACM Transactions on Storage, 5(1), 2009. ISSN: 1553-3077.

[14] G. A. Marson and B. Poettering. Practical Secure Logging: Seekable Sequential Key Generators. Cryptology ePrint Archive, Report 2013/397, 2013. http://eprint.iacr.org/.

[15] G. A. Marson and B. Poettering. Even More Practical Secure Logging: Tree-Based Seekable Sequential Key Generators. In Proceedings of European Symposium on Research in Computer Security, volume 8713 of Lecture Notes in Computer Science, pages 37-54, Wroclaw, Poland, 2014. Springer. ISBN 978-3-319-11211-4.

[16] S. Micali and L. Reyzin. Physically Observable Cryptography. In Moni Naor, editor, Theory of Cryptography, volume 2951 of Lecture Notes in Computer Science, pages 278-296. 2004. ISBN 978-3-540-21000-9.

[17] K. Pietrzak. A Leakage-Resilient Mode of Operation. In Proceedings of Advances in Cryptology, pages 462-482, Cologne, Germany, 2009. ISBN 978-3-642-01000-2.

[18] B. Schneier and J. Kelsey. Secure audit logs to support computer forensics. ACM Transactions on Information and System Security, 2(2):159-176, 1999.

[19] A. A Yavuz, P. Ning, and M. K. Reiter. BAF and FI-BAF: Efficient and Publicly Verifiable Cryptographic Schemes for Secure Logging in Resource-Constrained Systems. Transactions on Information System Security, 15(2):9, 2012. ISSN 1094-9224.

[20] Y. Yu, F.-X Standaert, O. Pereira, and M. Yung. Practical leakage-resilient pseudorandom generators. In Proceedings of Conference on Computer and Communications Security, pages 141-151, Chicago, USA, 2010. ISBN 978-1-4503-0245-6.

BRIEF SUMMARY OF THE INVENTION

Logging devices according to the introduction are generally used to receive log messages to be stored on some kind of permanent storage media. In some applications, authenticated encryption is used to make these logging devices resistant against attacks on the integrity of the log messages.

The present invention was conceived in view of the problem of increasing resistance against such attacks.

As a solution to this problem, a logging device according an embodiment is proposed, which is configured to store log messages, comprising a storage device having a plurality of log entry locations which can be ordered as a sequence, an encryption device configured to generate encrypted log messages from log messages, an authentication code generator configured to generate an authentication code from an encrypted log message, a key evolving device and a state storage device, wherein the state storage device is configured to store state variables for use by the encryption device and/or the authentication code generator and/or the key evolving device, wherein each of the log entry locations is configured to provide storage space for a log entry, wherein the key evolving device is configured to provide a pseudo-random sequence of secrets from an initial status, wherein the logging device comprises a position determination device configured to determine a log entry location in which a given log entry is to be stored.

The logging device according to an embodiment of the invention allows for arbitrary locations to be chosen for storing a particular log entry. In this way, an attacker cannot be sure where any particular log entry is actually stored and can thus not venture to add, change or delete any particular log entry.

The position determination device may be configured to choose the log entry locations using a pseudo-random sequence of locations calculated from an initial status. This allows for easy replay of the locations for verification and increases security as the sequence of locations does not need to be shared between the logging device and a verification device, e.g. as a table. Furthermore, invalid entries that result from a crash can be distinguished from invalid entries that were created due to an attack.

The position determination device may be configured to produce a plurality of dummy entries as part of an initialisation. These dummy entries cannot be distinguished by an attacker from regular log entries. If any of the dummy entries has been tampered with, this would indicate that an attack has occurred. Furthermore, if the log is shorter than the number of dummy log entries created, this would also indicate that an attack has occurred.

The position determination device may further be configured to only use as many log entry locations as there are log entries and dummy entries. This could be used for example to produce a growing log file instead of using a fixed log size.

The position determination device may be configured to, when an additional log entry is to be stored, to instruct the storage device to move a previously stored log entry from a selected log entry location into an additional log entry location and to store the additional log entry in the selected log entry location. In this way, encrypted log entries are swapped such that they are distributed in a random fashion. An attacker will thus not be able to identify any particular log entry to attack or modify.

The problem is also solved by a method of storing log entries in log entry locations of a storage device of a logging device according to an aspect of the invention, comprising the steps of encrypting a log message using a secret to create an encrypted log message; calculating an authentication code from the secret and the encrypted log message to create a log entry comprising the encrypted log message and the authentication code; determining one of the log entry locations to become a selected log entry location for storing the log entry; wherein the selected log entry location is determined by using a pseudo random function.

This makes it harder for an attacker to identify any particular log entry for modification or deletion.

A plurality of dummy log entries may be created during an initialisation phase. If any of these dummy log entries is modified, this would indicate that an attack has occurred. Furthermore, if the log is shorter than the number of dummy log entries created, this would also indicate that an attack has occurred.

The log entry locations may be organized as a numbered sequence. Furthermore, it may be advantageous to only use as many log entry locations as there are log entries and dummy log entries to be stored and in that an unbroken sequence of log entry locations is used to store the log entries and the dummy log entries.

In this way, it is possible to use a growing log file instead of always using an entire storage device.

When a new log entry is to be stored, the following steps may be carried out: determining a new log entry location to be added to the unbroken sequence of log entry locations as a new log entry location; determining the selected log entry location from the previously used log entry locations using a pseudo random generator; copying the log entry stored in the selected log entry location to the new log entry location; and storing the new log entry in the selected log entry location.

This allows for a random permutation of log entries and further increases resistance of the logging device against tampering relating to particular and individual log entries.

BRIEF DESCRIPTION OF THE DRAWINGS

The present invention will be described with the aid of the accompanying drawings, which schematically show aspects of the present invention, are provided by way of example only and are not intended to limit the scope of the present invention.

DETAILED DESCRIPTION

Figure 1:
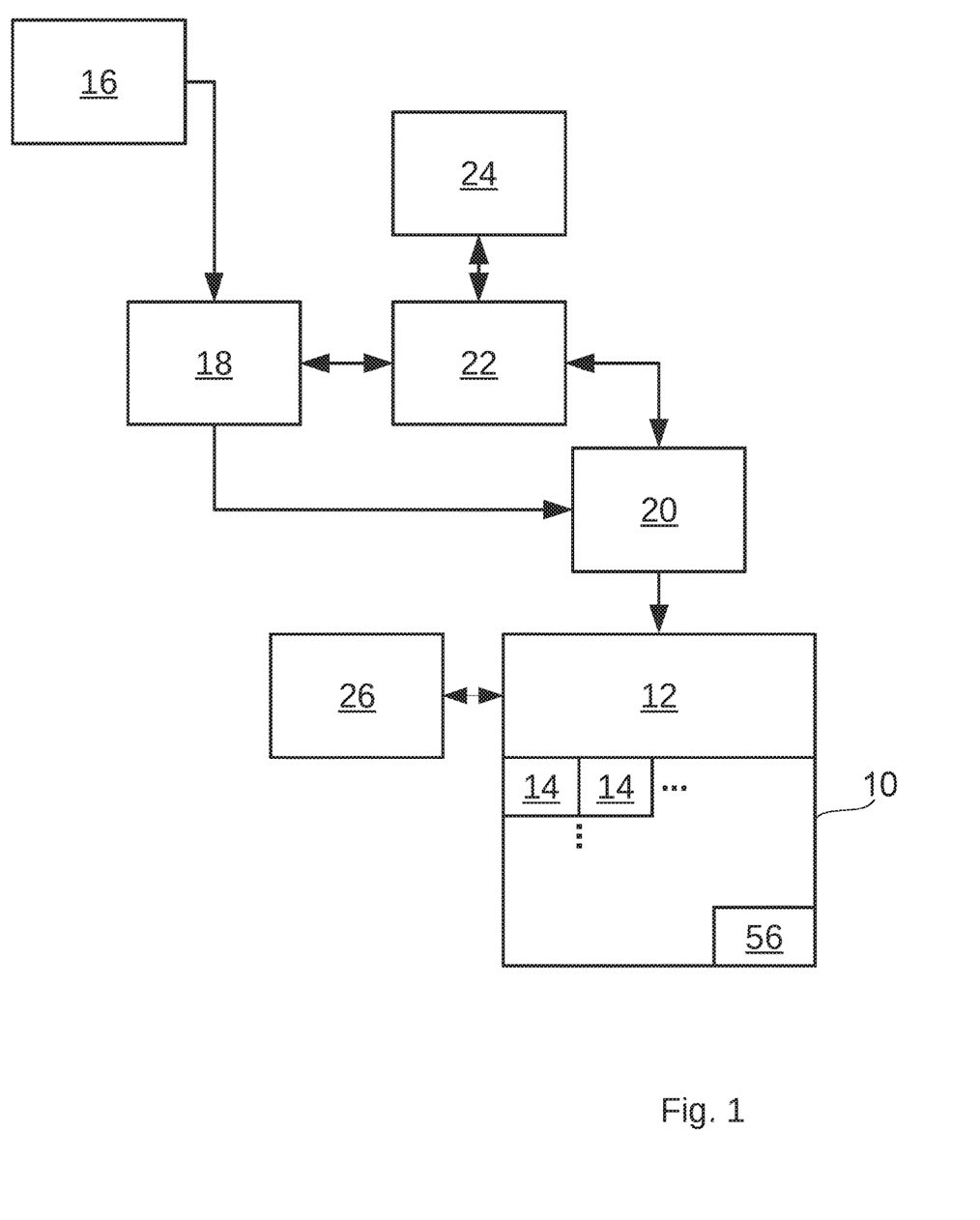
FIG. 1 is a schematic view of a first embodiment of the logging device according to the present invention.

A logging device 10 as shown in FIG. 1 comprises a storage device 12 onto which log messages are to be stored. The storage device 12, which may for example comprise a hard disc, a tape storage or any other form of sufficiently permanent storage means, may for example be divided into a plurality of storage locations. Storage locations that can hold data associated with a single log message, as is the case in the presently discussed embodiment, can be referred to as log entry locations 14.

Figure 3:
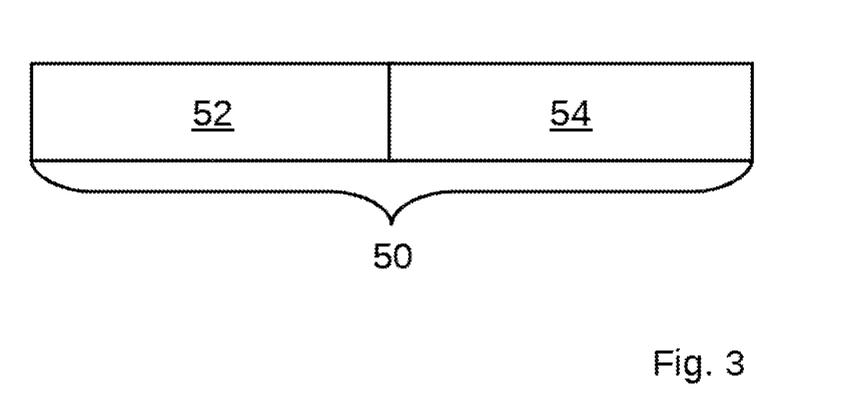
FIG. 3 is a schematic view of a storage format of a log entry in a storage device.

An example of a log entry 50 which may be stored in a log entry location 14 is shown in FIG. 3. The log entry 50 comprises an encrypted log message 52 and an authentication code 54.

Log messages, which may consist of structured or unstructured data, are received by a log message receiver 16 (FIG. 1), for example, which might perform necessary transcoding, arrangement, reformatting and/or repackaging of the log message data. The log message receiver 16 is only required, if such preliminary treatment of incoming log messages is necessary.

The log message receiver 16—or, if no log message receiver 16 is present, the device producing the log message data—hands the log message data over to an encryption device 18 which encrypts the log message data to produce an encrypted log message 52. The encrypted log message 52 is transferred to an authentication code generator device 20 which generates the authentication code 54 by means of which authenticity and integrity of the encrypted log message 52 can be verified.

Together, the encrypted log message 52 and the authentication code 54 is form a log entry 50 which is transmitted to the storage device 12. The storage device 12 receives the log entry 50 and stores each received log entry 50 in a log entry location 14. Although the actual layout of storage space and log entry locations 14 within the storage device 12 may be different, the log entry locations 14 may be interpreted as forming a numbered sequence such that each log entry location 14 may be identified for example by a single number that is mapped to a particular log entry location 14.

The encryption device 18 may implement any suitable encryption algorithm, for example AES, Twofish, Serpent or Camellia. Symmetric encryption algorithms may be preferred due to their generally higher throughput. All encryption algorithms make use of some kind of secret that is required to encrypt and decrypt data. To successfully decrypt data that was encrypted with a particular secret, that secret needs to be known by a decrypting party.

The authentication code generator device 20 may implement any suitable algorithm that generates an authentication code from a message and a secret, for example HMAC or CMAC.

In the present embodiment, the encryption device 18 and the authentication code generator device 20 use the same secret which is stored in a state storage device 22. Each time a log entry 50 has been successfully generated, the secret that is stored in the state storage device 22 is replaced with a new secret that is provided by a key evolving device 24.

The key evolving device 24 comprises, for example, a pseudo random generator to provide a sequence of secrets that is deterministic and only depends on an initial value. To make it hard for an attacker that has compromised the system to gain access to the entire sequence of secrets, the initial value is not stored but discarded after the first secret has been generated. Just as well, old values are not stored but are discarded once the next secret has been generated. One algorithm that may be used to construct a suitable pseudo random generator is the algorithm of Pietrzak (K. Pietrzak. A Leakage-Resilient Mode of Operation. In: Proceedings of Advances in Cryptology, pages 462-482, Cologne, Germany, 2009. ISBN 978-3-642-01000-2.). This algorithm uses the last generated secret to calculate the next secret.

Further to the authentication code 54, the authentication code generator device 20 may generate a chain authentication code 56 which is also transmitted to the storage device 12 with every log entry 50. The storage device 12 keeps the latest chain authentication code 56 in a storage location that is always overwritten as soon as a new chain authentication code 56 is provided. While the authentication code 54 depends only on the current encrypted log message 52 and the secret that was used to encrypt the current encrypted log message 52, the chain authentication code 56 is calculated using the secret that was used to encrypt the current encrypted log message 52, the authentication code 54 that was obtained for the current encrypted log message 52 and the chain authentication code 56 that was obtained for the previous encrypted log message 52. In this way, the chain authentication code 56 depends on all the previously encrypted log entries 50. Even if an attacker were to successfully change one encrypted log message 52 together with its associated authentication code 54, the chain authentication code 56 would indicate that part of the sequence of log entries 50 was changed.

To protect against an attack in which an attacker modifies or deletes some of the most recent log entries 50 to hide traces of its own attack, the logging device 10 comprises a position determination device 26. The position determination device 26 may be attached to the storage device 12, the authentication code generator device 20 or the encryption device 18. For each log entry 50, the position determination device 26 determines into which log entry location 14 the log entry 50 is to be stored.

In one particular embodiment, the position determination device 26 provides for a growing log, that is a log in which only the first n log entry locations 14 are being used, wherein n is increased by 1 for every additional log entry 50. Each time a new log entry 50 is added to the storage device 12, n is increased by 1. The position determination device 26 then randomly chooses one of the n log entry locations 14. The log entry 50 stored in that log entry location 14 is moved to the last log entry location 14 and the new log entry 50 is stored in the randomly chosen log entry location 14. Given an appropriate pseudo random generator to choose one of the log entry locations 14, this method produces a uniformly random distribution of log entries 50 over the n log entry locations 14 that are in use. Such a pseudo-random generator may also comprise a secret that is stored in a storage device, for example in the state storage device 22. Furthermore, the secret may be evolved by an evolving device such as the key evolving device 24. It is possible for the position determination device 26, the encryption device 18 and the authentication code generator device 20 to utilize the same state storage device 22 and the same key evolving device 24.

To reproducibly randomize the distribution of log entries 50, a new variant of "algorithm P" by Knuth can be used (D. E. Knuth. The Art of Computer Programming, Semi-Numerical Algorithms, volume 2, chapter 3.4.2, pages 139-140. Addison-Wesley, second edition, 1981. ISBN 978-0201896848.) which can be represented as follows:

Input: Old state, log event $m_i$
Output: Updated state $\Sigma_i$
// Let $\Sigma_{i-1} = (\kappa_{i-1}, \mathcal{S})$, $|\mathcal{S}| = \lambda + i - 1$,
$\kappa_{i-1} = (EK_0, EK_1, EX, HK_0^0, HK_1^0, RK_0, RK_1, RX, ctr)$ 1  $c_i = \text{Enc}_{\kappa_{i-1}}^*(m_i)$; $h_i = \text{HMAC}_{\kappa_{i-1}}^*(c_i, 0)$;
2  $s_i = (c_i, h_i)$;
3  $\text{pos} \xleftarrow{\$PRG(RX)} \{1, ..., \lambda + i\}$;
4  $\kappa_i = \text{Evolve}^{Cr}(\kappa_{i-1})$;
5  if $\text{pos} = \lambda + i$ then $\mathcal{S} = \mathcal{S}[\text{pos}] = s_i$;
6  else $\mathcal{S} = \mathcal{S}||\mathcal{S}[\text{pos}]$; $\mathcal{S}[\text{pos}] = s_i$;
7  output $\Sigma_i = (\kappa_i, RK_i, \mathcal{S})$;

In this logging method $\text{Log}^{Cr}$, the references denote the following:
$s_i$ the current log entry 50
$m_i$ the current log message
$c_i$ the current encrypted log message 52
$h_i$ the current authentication code 54
pos the position of the log entry location 14 in which the current log entry 50 is to be stored
$\kappa_{i-1}$ the secret used for encrypting the current log message 52, for obtaining the current authentication code 54 and for obtaining the position pos The random shuffling of the growing sequence of log entry locations 14 storing log entries 50 is gradually built by swapping the newly added integer with a log entry 50 at a random log entry location 14 in the sequence. Applied to the generation of a log file, a new log entry 50 is swapped with a (pseudo-) randomly chosen previous log entry 50. As a result, at all times, each of the log entries 50 is at any specific position or log entry location 14 with a probability of 1/n.

To add protection against attacks in which the log is mostly wiped, a number $\lambda$ of dummy entries is added to the log as part of an initialisation step. This way, an attacker does not even know if one certain log entry 50 contained in a particular log entry location 14 is an actual log entry or a dummy entry.

The method used can be represented as the following method $Gen^{Cr}$:

|   | Input: Security parameter $\lambda$ |
|---|---|
|   | Output: Initial state $\Sigma_0$ |
| 1 | ctr = 0; |
| 2 | $\kappa_0 = ((EK_0, EK_1, EX, HK_0^0, HK_1^0, RK_0,$ $RK1, RX) \xleftarrow{\$} \{0, 1\}^{\theta-\lambda}, ctr);$ |
| 3 | $\mathcal{S} \leftarrow \lambda$ randomly ordered dummy entries; |
| 4 | output $\Sigma_0 = (\kappa_0, \mathcal{S})$ |

The multitude of log entry locations 14 of the storage device 12 is represented by the reference S above. The initial secret $\kappa_0$ is also filled with initial values. Further to the above, the initial secret $\kappa_0$ is stored separately outside of the logging device 10 such that it may be used by a log verification device to verify the integrity of the log entries 50 stored in the log entry locations 14.

All log entries are stored in the storage device 12 organized as a dynamic sequence or array S. The method initializes the array S by inserting $\lambda$ encrypted dummy log entries in random order. It will create these random dummy log entries by using logging method $Log^{Cr}$.

The purpose of these dummy elements is to protect against adversaries trying to remove all or nearly all entries from the log. As the log contains at least $\lambda$ log entries, even in case of a crash, an attacker would have to present a valid log size of at least $\lambda$. Requiring a minimum log size greatly increases security.

$Gen^{Cr}$ also initializes initial secret $\kappa_0$ containing keys for encryption, generation of authentication codes and pseudo random generators. Initial secret $\kappa_0$ is shared between the logging device 10 and a verification device described later. In practice, the initial array S does not need to be shared with the verification device. Rather, it is possible to make the generation of dummy log entries 50 dependent on a pseudo random generator, the seed of which can be made available to the verification device.

The key evolving device 24 may implement the following method $Evolve^{Cr}$ to generate the next secret:

|   | Input: Old key $\kappa_{i-1}$ |
|---|---|
|   | Output: Updated key $\kappa_i$ |
|   | // Let $\kappa_{i-1} = (EK_0, EK_1, EX, HK_0^0, HK_1^0,$ $RK_0, RK_1, RX, ctr)$ |
| 1 | $(EK_{ctr\ mod\ 2}, EX) = PRF_{EK_{ctr\ mod\ 2}}(EX);$ |
| 2 | $(HK_{ctr\ mod\ 2}^0, HX^0) = PRF_{HK_{ctr\ mod\ 2}^0}(HX^0);$ |
| 3 | $(RK_{ctr\ mod\ 2}, RX) = PRF_{RK_{ctr\ mod\ 2}}(RX);$ |
| 4 | ctr = ctr + 1; |
| 5 | output $\kappa_i = (EK_0, EK_1, EX, HK_0^0, HK_1^0,$ $HX^0, RK_0, RK_1, RX, ctr);$ |

Figure 2:
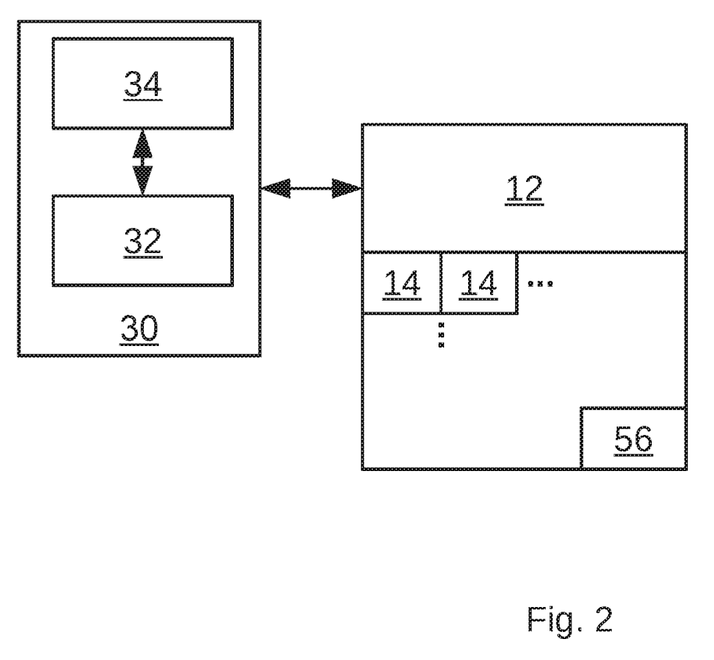
FIG. 2 is a schematic view of a verification device according to the present invention.

When the logging device 10 is suspected to be compromised, the storage device 12 may be disconnected from the logging device 10 and connected to a verification device 30 as shown in FIG. 2. The verification device 30 comprises a state storage device 32 and a key evolving device 34 which are similar to the state storage device 22 and the key evolving device 24 of the logging device. In particular, the key evolving device 34, once it is provided with the same initial secret as the key evolving device 24, will produce the same sequence of secrets as the key evolving device 24 of the logging device 10.

For verification that the log entries 50 have not been tampered with, the verification device 30 may use the following method $Recover^{CrOpt}$:

|   | Input: State $\Sigma$ to check, initial state $\Sigma_0$ |
|---|---|
|   | Output: Set of recovered log message$\mathcal{R}$ |
|   | // Let $\Sigma_0 = (\kappa_0, S)$, $\kappa_0 = (EK_0, EK_1, EX,$ $HK_0^0, HK_1^0, RK_0, RX, ctr)$ |
|   | // Parse $\Sigma$ as $((\cdot), (\cdot), s_1', \ldots, s_{n'\leq n}')$, let $S_{j\leq n'} = (c_j', h_j')$ |
| 1 | $\mathcal{R} = \emptyset; \xi = \emptyset;$ |
| 2 | for j = 1 to n' - cs do |
| 3 | Compute $\pi_j$; |
| 4 | $\kappa_j = Evolve^{Cr}(\kappa_{j-1});$ |
| 5 | end |
|   | // Outer Loop |
| 6 | for j = 1 to n' + cs do |
|   | // Inner Loop |
| 7 | for l = n' - cs to n' + cs do |
| 8 | $pos \xleftarrow{\$PRG(RX)} \{1, \ldots, l\};$ |
| 9 | $\xi = \xi \cup \{l, pos\};$ |
| 10 | Compute $\pi_i$; |
| 11 | if $HMAC_{\kappa_{j-1}} *(c_{\pi_l[l]}', 0) = h_{\pi_l[l]}'$ then |
| 12 | $\mathcal{R} = \mathcal{R} \cup \{m_j = Dec_{\kappa_{j-1}} *(c_{\pi_l[l]}')\};$ |
| 13 | break Inner Loop; |
| 14 | end |
| 15 | end |
| 16 | $\kappa_j = Evolve^{Cr}(\kappa_{j-1});$ |
| 17 | end |
| 18 | if $(n' < \lambda) \lor (\exists j \in \{1, \ldots, n' - cs\};$ $j \notin \mathcal{R} \land j \notin \xi) \lor (\mathcal{R} < n' - cs)$ then output 0; |
| 19 | else output $\mathcal{R} \setminus \{dummy\ messages\};$ |

Further to verifying that the log entries 50 are authentic, this algorithm is able to distinguish changes effected due to an attack and changes effected due to a crash. This is achieved by calculating the positions of log entries 50 or rather by calculating those permutations $\pi$ of log entries 50 that would have resulted from the growth of the log had the log been grown in the correct sequence and verifying that one of those permutations, preferably the last one, is actually represented by the sequence of log entries 50.

Most modern storage devices 12 have temporary memory in which data is buffered before being written to the actual media. Such memory is called a cache. The cache allows the storage device 12 to continue accepting data e.g. if an underlying storage is not ready to receive and/or write further data. The risk involved in this method, however, is that data that was buffered in the cache is lost when power is unexpectedly lost because the data could not be written to the actual media in time.

If such an event happened, an unknown number of log entries 50 may be lost before being written to log entry locations 14. Although only useful if this case is to be handled by the logging device 10 as well, the method disclosed herein takes into account a cache size cs of the storage device 12.

$Recover^{Cr}$: The main idea of the optimistic $Recover^{CrOpt}$ algorithm shown above is to reconstruct permutations $\pi$ of log entries out of a potentially crashed state. As a verifier V knows the initial seed of the PRG, they can recompute variable pos and consequently which log entries in array S have been swapped each time $Log^{Cr}$ was executed. Thus, for all i, V can compute permutation $\pi_i$.

For ease of exposition, we omit details how a permutation pi is computed out of $\pi_{i-1}$ and pos in the algorithm, yet this is straightforward. Updating a permutation can be achieved with O(1) time complexity.

Let n' be the number of log entries that we can parse out of state $\Sigma$. Parse simply means that we can identify a dataset with n' log entries, e.g., based on finding ciphertext-hash tuples. We iterate in an outer loop over all possible log entries j that we could theoretically restore, i.e., n'+cs many. If we can parse n' log entries, a crash might have happened anywhere between writing the (n'−cs)th and (n'+cs)th log entry. As any possible combination of writes might have been lost, we try in an inner loop to iterate over all possible permutations that can give us the location of log entry j. For each possible location, we verify whether log entry j can be found in that location by verifying the HMAC using the key for j.

State $\Sigma$ has to have at least $\lambda$ entries that the verification device 30 (=the Verifier V) can parse, because the log file starts with the $\lambda$ dummy entries. If we can parse less than $\lambda$ log entries out of $\Sigma$, then there was malicious behavior.

To further detect malicious behavior, the algorithm maintains the two sets R and E. Set R contains all messages that have been successfully recovered. Set E contains all messages that are expendable. A message is expendable, if it might have been lost due to a crash. When examining state $\Sigma'$ comprising n' log entries, V assumes that L crashed anywhere between adding log message mn'−cs+1 and log message mn'+cs. Let $\pi[i]$ be the position of the log entry of message mi. If the logging device 10 had to write into $\pi[i]$ (the log entry location 14 identified by its sequence number i), see lines 5 and 6, then the log entry 50 of message mi might have been lost in the crash and becomes expendable. For each log entry 50 of a message mi added at time i, method $Log^{Cr}$ writes into position i and one randomly chosen position pos. Therefore, mi and the messages residing at position pos become expendable. We use the set of expendable messages E to detect malicious behavior. If there is a message missing that is not expendable, then there has been malicious behavior.

In any case, verification device 30, V will be able to restore at least (ni−cs) log entries. So, if V can only restore less than (ni−cs) log entries, an adversary has tampered with the log.

The outer loop of Algorithm 13 has time complexity O(n), and the inner loop O(1) as cs is constant. Total time complexity is therefore in O(n) which is optimal. For completeness sake, note that dummy elements need to be removed from set R in step 19.

In a further embodiment, a worst-case recovery method may be applied in which, for each log message $m_i$, its index i is encrypted and stored together with the log message $m_i$ as part of the log entry 50, $s_i$. Verifier V starts recovery by sorting log entries of a state based on their encrypted indices to build a sorted list of indices in a first step. Then, in a further step, for all possible messages $m_i$, $i \in \{1, \ldots, n\}$, V searches through the list of sorted indices to get $s_i$. In a final step, $s_i$ can be verified and decrypted. Sorting has time complexity O(n log n), and recovering all n possible messages has complexity O(log n) per message, so the total complexity would be O(n log n).

An associated logging method $Log^{CrWC}$ is straightforward. The index i cannot be stored in plain and will need to be encrypted. Otherwise, an attacker A would again be able to determine which log entry in the log corresponds to which log message. The log entries 50 as stored by $Log^{CrOpt}$ are extended by encrypted index $k_i$ which is calculated to be $PRF_{EK}(i)$. A log entry $s_i$, 50 thus comprises three components ($c_i$, $h_i$, $k_i$). The key EK is evolved as previously described in a repeatable fashion in $Evolve^{CrOpt}$.

The recovery algorithm $Recover^{CrWC}$ is represented as follows:

---

Input; State $\Sigma$ to check, initial state $\Sigma_0$
Output: Sequence of recovered log messages
// Let $\Sigma_0 = (\kappa_0, S_0)$, $\kappa_0 = (EK_0, EK_1, EX, HK_0^0, HK_1^0, RK_0, RK_1, RX, ctr)$
// Parse $\Sigma$ as $((\cdot),(\cdot),s_1',\ldots,s_{i=n}')$, let $s_{j=i}' = (c_j', h_j', k_j')$
1 Search Tree = $Sort(s_1',\ldots,s_i')$; // Sort using keys $k_j'$
2 $\mathcal{R} = \emptyset$;
3 for j = 1 to i + cs do
4 $\quad k = PRF_{EK_{j-1} \bmod 2}(j)$;
5 $\quad (c_j', h_j') = BinSearch(SearchTree, k)$;
6 $\quad$ if $HMAC\kappa_{j-1}^*(c_j', 0) = h_j'$ then $\mathcal{R} = \mathcal{R} \cup Dec_{k_{j-1}}^*(c_j')$;
7 $\quad \kappa_j = Evolve^{Cr}(\kappa_{j-1})$;
8 end

---

$Recovery^{CrWC}$: Verifier V will receive some state $\Sigma_n$ containing a random permutation of all log entries $s_i$. Recovery algorithm $Recovery^{CrWC}$ starts by sorting log entries $s_i$ in $\Sigma$ using $k_i$ as sorting key. The sort can be performed by inserting each log entry 50 in an AVL or Red-Black tree. Total run time for this operation will be in O(n log n).

To restore all log messages $m_i$, V first re-computes $k_i$ and, for each i, performs a binary search for $s_i$ through the sorted list of log entries using key $k_i$. If $s_i$ is found, then V verifies the HMAC and adds a decrypted $m_i$ to a result set R.

$Recovery^{CrWC}$ uses the same security verification as $Recovery^{CrOpt}$.

The logging device 10, verification device 30 and the methods for their use disclosed herein provide improved resistance against manipulation of log data by an attacker. Furthermore, in certain embodiments, the ability to recover the log from crashes and to distinguish between crash-related and attacker-related inconsistencies is improved.

LIST OF REFERENCE SIGNS 10 logging device
12 storage device
14 log entry location
16 log message receiver
18 encryption device
20 authentication code generator device
22 state storage device
24 key evolving device
26 position determination device
30 verification device
32 state storage device
34 key evolving device
50 log entry
52 encrypted log message
54 authentication code
56 chain authentication code While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of verifying integrity of log entries stored in log entry locations of a storage device, the method comprising:
   replaying a pseudorandom generator used to determine log entry locations for storing log entries to determine a log entry location in which a particular log entry is to be stored after a predetermined number of log entries has been stored using a method comprising:
      encrypting a log message using a secret to create an encrypted log message;
      calculating an authentication code from the secret and the encrypted log message to create a log entry comprising the encrypted log message and the authentication code; and
      determining a random one of the log entry locations to become a selected log entry location for storing the log entry;
      wherein the selected log entry location is determined by using a pseudo random function,
      wherein the log entry locations are organized as a numbered sequence, in that only as many log entry locations are used as there are log entries and dummy log entries to be stored and in that an unbroken sequence of log entry locations is used to store the log entries and the dummy log entries, and
   verifying integrity of the log entry stored in the log entry location previously determined by verifying the authentication code stored together with the encrypted log message.

* * * * *